June 24, 1969  J. W. HENLEY  3,451,228
UNIVERSAL COUPLING
Filed Nov. 6, 1967

John W. Henley
Wood, Herron & Evans
ATTORNEYS

United States Patent Office 3,451,228
Patented June 24, 1969

3,451,228
UNIVERSAL COUPLING
John W. Henley, Willoughby, Ohio, assignor to Eagle-Picher Industries, Inc., Cincinnati, Ohio, a corporation of Ohio
Filed Nov. 6, 1967, Ser. No. 680,738
Int. Cl. F16d 3/22
U.S. Cl. 64—16                                    7 Claims

ABSTRACT OF THE DISCLOSURE

A universal coupling for a pair of rotatable shafts, having a flat semicircular end or spade at the end of one shaft which is received in a flat first socket for rotation in a first plane defined by the socket, and a second semicircular end or spade provided integrally with the socket and which is received in a second socket at the end of the other shaft for rotation in a second plane perpendicular to the first plane.

---

This invention relates to universal couplings and, in particular, relates to a novel universal coupling structure.

A universal coupling is a linkage or joint between two shafts, for example, a driving shaft and a driven shaft, which permits rotation of the shafts when their axes do not coincide. Such couplings are very widely used, for example, in machine tools, instruments, control devices, and automobiles.

One well-known type of universal coupling structure is known as "Hooke's joint." Hooke's joint basically comprises two yokes, each of which is attached to the end of a shaft. The yokes are interconnected by means of a cross, each yoke being pivotable about one arm of the cross. A variation of this uses two Hooke's joints spaced with an intermediate shaft between the two primary shafts. This double Hooke's joint has been found to cut down on the variation in angular displacement and angular velocity between the driving and driven shafts, which variation is objectionable in some uses.

Another type of universal coupling structure is known as the Bendix-Weiss joint. This uses four large balls as motion transmitting elements between the two shafts while a smaller center ball acts as a spacer between the ends of the shafts. The four large balls are maintained at all times in a single plane during rotation of the driving and driven shafts by means of milled grooves in a yoke attached to the end of each shaft.

Generally speaking, it can be said that universal coupling structures are permanent in nature, that is, generally they are not readily disassembled or reassembled. Of course, under certain circumstances it may be desirable to periodically disassemble and reassemble a universal coupling for shipment, maintenance, or the like. The universal coupling structure of this invention permits easy and simple assembly and disassembly.

This invention is based on the concept of a universal coupling for joining two shafts which, in preferred form, includes (a) a spade having an arcuate outer periphery and connected to a first shaft end, (b) a yoke or socket having an arcuate inner periphery and connected to a second shaft end, and (c) an intermediate coupling or transition piece having a socket with an arcuate inner periphery in which the spade is received, and a flange with an arcuate outer periphery which is in turn received within the yoke, the planes of the socket and the flange being substantially transverse one to the other so that the spade can oscillate in one plane within the socket and the flange can oscillate in a second transverse plane within the yoke. Preferably, the coupling is fabricated of a polyurethane elastomer and is dimensionally configured so as to permit a snap-in relationship for the spade and yoke with respect to the coupling member.

Thus, it has been an objective of this invention to provide a universal coupling that can be readily assembled and disassembled with a minimum of effort. This and other objectives and advantages of the invention will become more apparent from the following detailed description taken in conjunction with the drawings in which.

Figure 1:
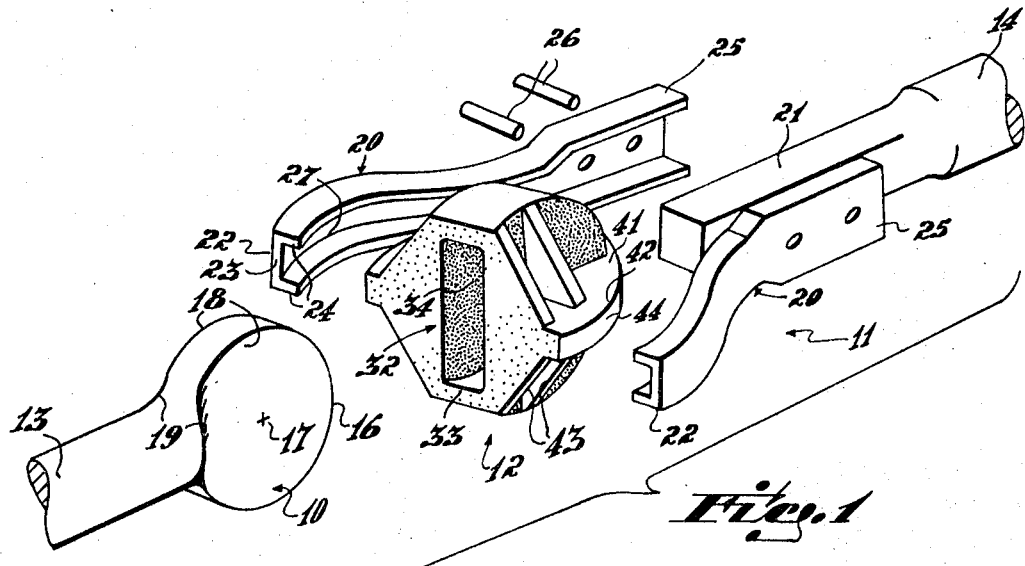
FIGURE 1 is an exploded, perspective view illustrating a preferred form of the universal coupling structure of this invention.

The universal coupling shown in the drawings basically comprises a spade 10, a yoke or socket 11 and a transition piece or coupling 12, see FIGURE 1. The spade 10 is connected to or formed integrally at one end of a first shaft 13 and the yoke 11 is connected to, or may be formed integrally in the one end of a second shaft 14. The coupling 12 links and joins the spade-bearing first shaft 13 and the yoke-bearing second shaft 14.

The spade 10 carried by the first shaft is preferably plate-like in configuration, the spade having an arcuate outer periphery 16, a center 17 of the arc 16, and opposed, flat, substantially parallel faces 18, 18. In the embodiment shown, the arcuate outer periphery 16 is a portion of a circle having a radius equal to the distance between the center 17 and the periphery 16. The faces 18, 18 of the spade 10 lie in planes parallel to the axial plane of the spade. Shaft 13 is joined to the spade on its periphery, as at 19. Although spade 10 is illustrated as being formed integrally with the shaft 13 the spade can be interconnected or mounted to the shaft by suitable means if desired.

Figure 4:
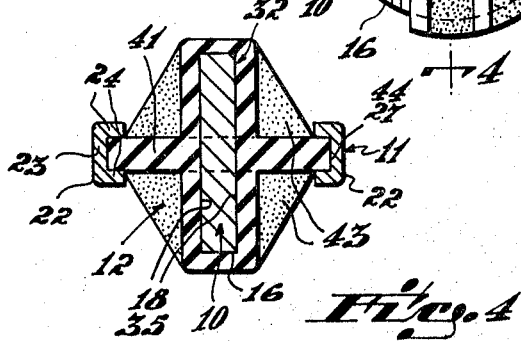
FIGURE 4 is a transverse section taken along lines 4—4 of FIGURE 3.

The yoke or socket 11 mounted to the second shaft 14 comprises a pair of opposed limbs or guides 20, 20 each of the limbs being mounted to a necked down, square cross-sectioned portion 21 at the end of the second shaft 14. Each limb 20 is preferably substantially channel-like, as at 22, the channel being defined by a web or base 23 and a wall or rim 24 at each edge of the base when considered in cross section, see FIGURE 4. Each limb 20 is held to the necked down portion 21 of the shaft 14 by a channel extension arm 25 and suitable fasteners such as rivets 26. Although two separately attached limbs 20 are illustrated in the drawings, it will be understood that the limbs 20 can be formed integrally to provide a one-piece yoke, as opposed to the two-piece yoke shown, and that the yoke can be formed integrally in the second shaft 14.

Figure 2:
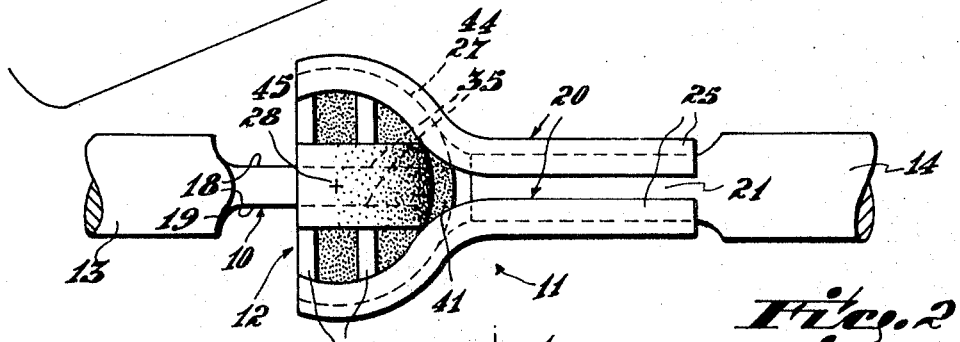
FIGURE 2 is a top view of the coupling shown in FIGURE 1.

As viewed from above, in FIGURE 2, each limb 20 flares outwardly from the end of the shaft 14, preferably in a substantially circular configuration, to provide an arcuate inner periphery 27 for the yoke 11. Thus, the preferred form of yoke 11 has an arcuate inner periphery 27 with a center 28, the yoke connected to the second shaft 14 substantially at the center of the yoke periphery, that is, substantially midway between the free ends of the limbs 20, see FIGURE 2. The radius of the arcuate inner periphery 27 is the distance from the center 28 to the periphery.

The arcuate inner periphery 27 defined by the limbs 20, 20 is an arc preferably of at least about $\pi$ radians but substantially less than $2\pi$ radians, see FIGURE 2. In other words, the yoke periphery 27 is somewhat more than a half circle but substantially less than a whole circle. This permits a snap-in interfit between coupling 12 and yoke 11, as will be subsequently explained further. That portion of the yoke's arcuate inner periphery 27 extending beyond the $\pi$ radian limitation constitutes the locking or snap-in sector of the arcuate inner periphery 27; preferably this sector is about 0.1 to about $0.5\pi$ radians, and is within the limits of resilient deformation of the material of which the joint is made.

Coupling 12 includes a socket 32 which is substantially rectangular in cross section, as at 33. The socket 32 defines an internal chamber that is preferably of substantially the same configurational dimensions, both as to arc radius and as to width, as the spade 10 mounted to the first shaft 13. That is, the distance between parallel, chamber face walls 35, 35 is substantially the same as the thickness between faces 18, 18 of the spade plate, with adequate clearance being provided to prevent binding. Thus, the axial plane of socket 32, is parallel to the face walls 35, 35. Also, the arcuate inner periphery 36 of the socket 32 is substantially circular in shape with a center 37, see FIGURE 3. The radius of arc 36 is the distance from the center 37 to the arc inner periphery 36. Preferably periphery 36 is an arc of at least $\pi$ radians but substantially less than $2\pi$ radians and, most preferably, the length of the arcuate periphery 36 is between about $1.1\pi$ and about $1.5\pi$ radians. Thus, in the preferred embodiment the outer opening to socket 32 has a length or major transverse dimension less than the diameter of the arcuate outer periphery 16 of the spade 10.

A flange or second spade-like portion 41 is defined in a plane substantially transverse to the plane of the socket 32, and extends exteriorly around the side walls of socket 32. The flange 41 is dimensioned, both as to thickness and as to arc radius, so that edge 42 of the flange is rotatably received in the channels 22, 22 presented by the limbs 20, 20. The edge 42 presents an arcuate outer periphery 44 having a center 45, see FIGURE 2, so that the radius of the arc 44 is the distance between the periphery 44 and the center 45. The arcuate outer periphery 44 is an arc preferably of at least about $\pi$ radians but substantially less than $2\pi$ radians and most preferably, is between about $1.1\pi$ radians and about $1.5\pi$ radians. The thickness of the flange 41 is preferably substantially the same as the internal distance between the opposed rims 24, 24 of each limb 20 with sufficient clearance being provided to prevent binding.

The transition piece 12 is also provided with reinforcing webs 43 both above and below the flange 41. The webs 43 are preferably integral with both the flange 41 and the socket 32, and are preferably positioned on both sides of the flange so as to provide structural support for the transition piece 12. Such structural support is particularly desirable in that it provides torsional stiffness for the universal coupling under operating conditions.

In assembly, the transition piece 12 may be first snapped into place within the yoke 11, the flange 41 being retained within the limbs 20. The limbs 20 are resiliently distended sufficiently to receive the flange 41, then snap-in to enclose and retain it. Because the limbs 20 define an arcuate path 27 within which the flange's arcuate periphery 44 resides, the transition piece 12 can oscillate from side to side within the yoke 11. The spade 10 is similarly snapped into place within socket 32, the spade being retained within the socket because the major transverse dimension a length of the chamber opening is less than the diameter of the spade. Because the spade periphery 16 is substantially arcuate and because the inner periphery 36 of the chamber defines an arcuate path, the spade 10 can oscillate within the socket 32.

Figure 3:
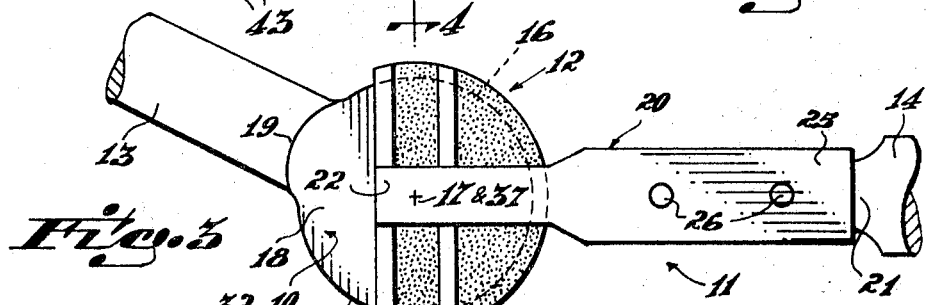
FIGURE 3 is a side view of the coupling.

Thus, the first shaft 13 is able to move in a swinging or oscillating relationship relative to the second shaft 14 through cooperation of the spade 10 and the transition piece's socket 32, see FIGURE 3; and the second shaft 14 is able to move in a swinging or oscillating relationship relative to the first shaft 13 through cooperation of the yoke 11 and the transition piece's flange 41, see FIGURE 2. Since the flange 41 and the socket 32 are in planes positioned at substantially right angles one to the other, the cooperative action between the spade 10, transition piece 12 and yoke 11 establishes a universal coupling capability.

Shims, not shown, may be placed between the extension arms 25 and the square cross-sectioned, necked down end 21 of shaft 14 during assembly of the yoke 11. The use of shims permits the compressive force with which the yoke limbs 20, 20 hold the coupling 32 to be varied as desired, thereby permitting the initial torque necessary to rotate the driving shaft of the two shafts 13, 14 to be varied. That is, by varying the compressive or preload force that holds the spade 10, yoke 11 and coupling 12 together the initial torque level (also, termed interference of the joint) required for the driving shaft to rotate the driven shaft can be changed. This permits an undesirable effect such as, for example, vibration, which may vary depending on the use of the joint, to be dampened out. Alternatively, and instead of using shims, the compressive force exerted by the yoke 11 on coupling 12 can be varied by milling the faces of the square cross-sectioned portion 21 of the shaft to the desired dimensions.

It is particularly preferred that an elastomeric material such as, for example, a polyurethane elastomer, be used for forming the transition piece 12 in the universal coupling structure described above. A polyurethane elastomer permits an especially effective snap-in engagement and disengagement of the spade 10 with the transition piece's socket 32 and of the yoke 11 about the transition piece's flange 41, thereby providing easy and simple assembly and disassembly of the coupling joint structure. It is particularly preferred that the polyurethane elastomer used have a dorometer value of between about 40 and about 80 in the Shore "D" scale, this range providing a polyurethane elastomer with a hardness that has been found most useful in the applications of this invention.

Having described the preferred embodiment of my invention in detail, what I desire to claim and protect by Letters Patent is:

1. A universal coupling for joining two shafts comprising
  a spade having an arcuate outer periphery, said spade being connected to a first shaft end,
  a yoke having an arcuate inner periphery, said yoke being connected to a second shaft end, and
  a coupling through which said spade is connected to said yoke, said coupling having a socket with an arcuate inner periphery, said spade being received in said socket for rotation in a first plane therein, and said coupling also having an external flange with an arcuate outer periphery received for rotation within said yoke, said yoke lying in a second plane which is substantially transverse to said first plane, said peripheries being dimensioned so that said spade is retained in snap-in engagement in said socket and so that said flange is retained in snap-in engagement in said yoke.

2. A universal coupling as set forth in claim 1 wherein said peripheries of said yoke, said socket, and said flange are arcs of at least $\pi$ radians but substantially less than $2\pi$ radians.

3. A universal coupling as set forth in claim 2 wherein said peripheries are arcs of between about 1.1π radians and about 1.5π radians.

4. A universal coupling as set forth in claim 3 wherein at least said coupling is formed from a polyurethane elastomer.

5. A universal coupling as set forth in claim 3 wherein said spade, said yoke, and said coupling are all formed from a polyurethane elastomer.

6. A universal coupling as set forth in claim 4 wherein said polyurethane elastomer has a durometer value between about 40 and about 80 on the Shore "D" scale.

7. A universal coupling as set forth in claim 1 wherein said yoke comprises two limbs both of which are mounted to one of said shafts to form the yoke configuration, said limbs each including an extension arm by means of which said limbs are mounted to said shaft, and including at least one shim positioned between at least one of said extension arms and said shaft.

References Cited

UNITED STATES PATENTS

| | | | |
|---|---|---|---|
| 1,826,662 | 10/1931 | Harel | 64—16 |
| 3,079,772 | 3/1963 | Reuter | 64—7 |
| 3,098,365 | 7/1963 | Pearson | 64—8 |

FOREIGN PATENTS

| | | |
|---|---|---|
| 261,091 | 11/1926 | Great Britain. |

HALL C. COE, *Primary Examiner.*